Patented Mar. 10, 1942

2,276,241

UNITED STATES PATENT OFFICE 2,276,241

MEDICINAL PREPARATION

Elbert M. Shelton, New Haven, Conn., assignor to The Tannin Corporation, New York, N. Y., a corporation of New York No Drawing. Application July 1, 1939, Serial No. 282,480

10 Claims. (Cl. 167—58)

This invention relates to a medicinal preparation and has for its object the provision of an improved preparation containing tannin. More particularly, the invention aims to provide an aqueous liquid preparation comprising a tannin of the catechol group and an antiseptic compound which does not impair the action of the tannin or lose its own properties as an antiseptic. The preparation of the invention is especially efficacious in the treatment of burns, and because of a number of properties which will be described herein, it may be used in the treatment of a wide range of superficial injuries and ailments in addition to burns.

The tannins are generally classed as belonging to either the pyrogallol group (tannic acid) or to the catechol group. The catechol tannins are of the condensed type, in contrast to the pyrogallol tannins which are a hydrolyzable type. The tannins extracted from barks such as hemlock or wattle belong to the catechol group. However, the extract of quebracho wood is a catechol tannin and I have found it to be especially efficacious for the purposes of this invention. Several catechol tannins are commercially available in the form of aqueous extracts.

Heretofore, tannin has been used quite extensively as a remedy for burns but its effect has not been uniformly satisfactory and some medical investigators have come to the conclusion that it frequently does more harm than good in the treatment of burns. The many failures in the use of tannin appear to be due to a number of causes among which may be mentioned the prevailing use of tannic acid, the failure to understand the necessity of using any kind of tannin at low concentrations in aqueous solution, and the selection of an antiseptic medium that would maintain effective germicidal action in the aqueous solution. It was not understood that tannins differ in their medicinal properties, and that tannic acid is unsuitable for the purpose intended. While all tannins have the property in common of being able to combine with the protein of a skin and convert it into an insoluble substance, they have many dissimilar properties in other respects, among which may be mentioned chemical stability and solubility relationships. Even in their common property of converting skin into leather, however, they do not act in the same way or with the same effectiveness.

It has generally been believed heretofore that the tannins would insolubilize or change the protein destroyed by burning and prevent it being absorbed into the blood, thereby preventing poisoning and shock and promoting the repair or healing process. The conditions under which the tannins have been used to accomplish these results have been in violation of the principles governing tanning action. While tannin extracts have been used rather generally in the treatment of burns, no distinctions were drawn with respect to particular types of tannin extracts, or to the concentration of tannin in an aqueous medium such as is necessary to give effective tanning action.

As a result of many years of experimentation, I have found that tannin in high concentration does not give the same medicinal effect as tannin extracts of low tannin concentration, and I have made the significant discovery that only the tannins of the catechol type may be used with dependable effectiveness in the treatment of burns and other ailments.

During the course of my investigations, I made measurements of the rate and depth of penetration of tanning agents into raw skin. It was readily demonstrated that the activity of the tanning agent was strongly influenced by the proportion of tannin to water in the mixture, and that practically every addition of other ingredients produced measurable changes in the tanning activity. Early experiments demonstrated the tannins of the catechol class to be very stable in water solution while the hydrolyzable tannins, such as tannic acid, broke down quickly unless protected from bacterial action. On the basis of such measurements, several preparations were made up and tested clinically. Clinical tests over a period of many years have not only confirmed a relationship between tanning activity and effectiveness as medicinal agents, but have demonstrated that the catechol tannins used in these preparations are free from the harmful effects which have frequently resulted from use of tannic acid.

As a result of my investigations, I have found that aqueous extracts of catechol tannin are most effective when the pH is relatively low and that various phenolic antiseptic compounds may be incorporated in the extracts without impairing the effectiveness of the tannin. Based upon the demonstrated penetrating power of tannins in the conversion of skin into leather, I found that the tannin concentration of the preparation must be obtained within certain limits to obtain the most effective medicinal action and that in order to insure the use of suitable concentrations, the preparation must be prepared in the form in which it is to be used. The extract of most effective concentration has such low viscosity that it is difficult to keep it on the burn or place requiring treatment. In order to overcome this difficulty and without impairing the concentration, I employ a suitable thickener, preferably pectin.

In forming a preparation according to the invention, I prefer to use the aqueous catechol tannin extract of relatively low non-tannin content. The tannin extracts commercially available contain extractives other than tannin, and the ratio of tannin to non-tannin is referred to herein as the "purity" of the extract. Commercial extracts of wattle and of quebracho are available, the purity varying between 2.5 and 4, and certain quebracho extracts may be procured having still higher purity, ranging up to approximately 10. I have found the activity of the tannin to increase with increasing purity. Although an ordinary commercial quebracho or wattle extract is active enough to be of some value in a medicinal preparation, there is a marked advantage in a more active tannin, and although I may use quebracho having a minimum purity of 4.5, I prefer a purity varying from about 7 to 10.

Except when suitable proportions of water are present, tannin is not an active tanning agent and with little or no water it does not tan at all. The most desirable ratio of tannin to water depends somewhat on other ingredients present, especially if they affect the viscosity of the preparation. In a simple aqueous solution of tannin extract, I prefer the tannin concentration to be between 2 per cent and 5 per cent. The presence of a thickening agent such as pectin retards the tanning and I find a higher tannin concentration more effective but do not recommend the use of any preparation containing over 10 per cent of actual tannin. For preparations of the type illustrated hereinafter, the actual tannin content should be between 8 per cent and 10 per cent.

Because the correct ratio of tannin to water is important for good tanning action, I have found it important to supply the preparation at the correct dilution for use. Evaporation may quickly change these proportions after the medicinal preparation has been applied to the injured area, and I consider it an important feature in treating a serious injury to cover the layer of tannin with a layer of material impervious to water, such as rubber, or wax-impregnated gauze. This not only hastens the action of the tannin, which may be sufficiently complete in a few hours, but it prevents the dressing adhering to the protective scab which forms.

Tannins are not in themselves germicidal, and it is necessary that an effective germicide be incorporated in the preparation to guard against infection occurring beneath the protective scab formed by the tannin. For the effectiveness of both the germicide and the tannin, it is important that they be compatible with each other. The chemical activity of the tannin eliminates from consideration all heavy metal salts, halogens, or other oxidizing agents, and aldehydes. Phenols are not only compatible with catechol tannins, but their germicidal activity is generally amplified by the presence of the tannin while the tendency to damage healthy tissue is lessened. Moreover, I find certain phenols more soluble in aqueous solutions of tannin than in water alone, permitting the use of an effective concentration of otherwise too-insoluble phenols.

While I have specified definite concentrations of certain phenols in formulae given below, I am not limited to these phenols and for any phenols chosen the concentration limits must be between a minimum for effective germicidal action and a maximum governed either by solubility or by damage to living tissue.

For the effectiveness of both tannin and germicide and for the stability of the tannin, the preparation must be kept acid. I have used a preparation of pH 6 with fair success where the thickening agent would not tolerate more acid without precipitation, but this product darkened with age. I prefer to adjust the acidity to between pH 3.0 and 4.0. For this purpose I find the addition of boric acid especially suitable, since with a catechol tannin it forms a complex which yields a solution of lower pH value than the aqueous solution of either the tannin or the boric acid alone. A suitable proportion of boric acid to tannin to produce the desired acidity has been found to be 1 to 4, yielding, as in Formula II below, a pH value of 3.5 to 3.6. In spite of the acidity indicated by this pH value, the preparation produces surprisingly little smarting or stinging sensation when applied to raw or inflamed outside body surfaces.

The increase of the viscosity is not an important factor so far as the medicinal value of the tannin is concerned; in fact, an increase in viscosity retards the rate of tannage, but the practical factor of convenience of application has justified a compromise in this case. The diminution of tanning activity is probably less than laboratory measurements indicate, since in practical use the more viscous solutions permit a much heavier coating to be retained on a body surface.

The choice of thickening agent is limited to substances comparatively inert to the tannins. Pectin and gum arabic are illustrations of suitable material. Locust bean extract may be used with certain precautions. It tends to precipitate in a few months unless the pH is adjusted to the upper allowable limits, around pH 6. I prefer pectin, which is stable at the lower pH values. In using the 100 grade pectin, 2 per cent gives a solution which may be poured yet does not run off too freely. In using any of these thickeners it is important that the thickening agent be fully dispersed in water before any tannin is introduced.

Practical considerations have led to incorporation of two other ingredients in the preferred formula, though these are not necessary and if used in excess would inhibit the tanning action. These are glycerol and urea which assist in holding the tannin in solution, retard drying, and favor formation of a more flexible protective scab. The maximum addition of each of these ingredients should be 5 per cent.

The following formulae are the ingredients used in forming the preparation of the invention in its more complete form; Formula II being the preferred preparation for reasons hereinbefore described:

Formula I

Ingredients A:

|  | Grams | Per cent |
|---|---|---|
| Commercial locust bean extract | 8 | 0.8 |
| Boric acid, powder, U. S. P. | 20 | 2.0 |
| Water, distilled | 600 |  |

Ingredients B:

|  | Grams | Per cent |
|---|---|---|
| Hexyl-resorcinol, crystals | 1 | 0.1 |
| Picric acid, cryst., -reagent quality | 5 | 0.5 |
| Glycerol, U. S. P. | 50 | 5.0 |
| Urea, crystals | 20 | 2.0 |
| Water, distilled | 100 |  |
| Quebracho extract, liquid 40% tannin content | 200 | 8.0 |

Mix the dry ingredients A, then disperse in the water while stirring and heating slowly in a water-bath.

Mix ingredients B until homogeneous, then stir into mixture A after the thickener has been thoroughly dispersed. Heat in an autoclave 2 hours at 6 to 8 pounds pressure (above atmosphere). This operation stabilizes the thickener, through decomposition of urea, thereby raising the pH to about 6.0.

Formula II

Ingredients A:

|  | Grams | Per cent |
|---|---|---|
| Pectin, "100 grade", powder | 30 | 3.0 |
| Boric acid, U. S. P., powder | 20 | 2.0 |
| Urea, white crystals | 50 | 5.0 |
| Water, distilled | 650 |  |

Ingredients B:

|  | Grams | Per cent |
|---|---|---|
| Quebracho extract, liquid, 40% tannin content | 200 | 8.0 |
| Glycerol, U. S. P. | 50 | 5.0 |
| Benzylated chlor-phenol ("Santophen 2" Monsanto Chemical Co.) | 1 | 0.1 |

Grind the dry ingredients A in a ball mill until thoroughly mixed. Add the dry mixture all at once to the water and by stirring and warming (not over 50 degrees C.) obtain a uniform paste.

Mix thoroughly ingredients B, then stir into the mixture comprising ingredients A.

For the treatment of burns and other surface injuries, the preparation of the invention is applied directly to the injured area in as heavy a coating as can be retained without its running off. In certain instances, it may be satisfactory to saturate a piece of gauze with the dressing and apply it over the injured area. For minor injuries, no bandage is needed unless to protect clothing. On serious injuries, the preparation is covered with gauze and bandage to retard evaporation. Since the tannin is effective only in the presence of water, it is advantageous to cover the preparation with a layer of material impervious to water such as sheet rubber or the like. In the case of very serious burns, repeated applications of the preparation may be used and in each case the evaporation is prevented by the use of sheet rubber. Such fibrous materials as bandages should not be placed in contact with the burn.

The preparation of the invention may be used most effectively in the treatment of such injuries as burns, irritations, cuts, abrasions, blisters, and in infections such as impetigo, athlete's foot, canker and cold sores, and deep cuts, when infected, to protect surrounding tissue from injury by the drainage from infection.

The preparation of the invention has the power of producing local anesthesia which is evidenced by a lessening of pain from burns and abrasions and the relief which it gives from itching in ivy poisoning, insect bites, shingles, etc. It has a styptic or coagulating power tending to form a protective scab over injured areas. By reason of the antiseptic agent incorporated in the preparation, infection is prevented from developing under scabs. Other advantages which have been demonstrated as being characteristic of the preparation of the invention are its readiness for use, its stability in storage over long periods, and its relative harmlessness and the inexpensive nature of its component parts.

I claim:

1. An aqueous medicinal preparation comprising an aqueous extract of catechol tannin of relatively high purity having sufficient tannin to give to the preparation a tannin content of from 2 to about 10 per cent by weight, a phenolic antiseptic compound in solution in the preparation and in sufficient quantity to impart antiseptic properties thereto, and boric acid in an amount sufficient to give the preparation a pH materially lower than the pH of the natural catechol tannin extract, whereby the preparation is stable and does not precipitate over relatively long periods.

2. An aqueous medical preparation comprising a tannin extract of the catechol group and boric acid as an acidifying agent in an amount sufficient to impart to the preparation a pH materially lower than the pH of the natural aqueous solution of the catechol tannin, whereby the preparation is stable and does not precipitate over relatively long periods, the tannin content of the preparation being above 2 percent and below about 10 percent.

3. An aqueous medical preparation comprising a tannin extract of the catechol group, and boric acid as an acidifying agent in an amount sufficient to impart to the preparation a pH materially lower than the pH of the natural aqueous solution of the catechol tannin, whereby the preparation is stable and does not precipitate over relatively long periods, the tannin content of the preparation being above 8 percent and below 10 per cent by weight.

4. An aqueous medical preparation comprising a tannin extract of the catechol group and boric acid as an acidifying agent in an amount sufficient to impart to the preparation a pH materially lower than the pH of the natural aqueous solution of the catechol tannin, whereby the preparation is stable and does not precipitate over relatively long periods, the tannin content of the preparation being above 2 percent and below 10 per cent by weight and the ratio of tannin to non-tannin in the tannin extract being above 4.5, and a phenolic antiseptic compound.

5. An aqueous medical preparation comprising a tannin extract of the catechol group and boric acid as an acidifying agent in an amount sufficient to impart to the preparation a pH of about 3 to 4, whereby the tannin is prevented from precipitating, the tannin content being from 8 to 10 per cent by weight, a phenolic antiseptic compound, and pectin in an amount sufficient to impart materially increased viscosity to the preparation.

6. A medicinal preparation comprising an aqueous tannin extract of the catechol group, in which the tannin content of the preparation is above 8 percent and below 10 per cent and the ratio of tannin to non-tannin in the preparation is above 4.5, boric acid as an acidifying agent in an amount sufficient to impart to the preparation a pH materially lower than the pH of the natural catechol tannin extract, whereby the preparation is stable and does not precipitate over relatively long periods, pectin in sufficient amount to impart to the preparation a materially increased viscosity, glycerol and urea to modify scab formation and to retard evaporation, and a phenolic antiseptic compound.

7. An aqueous medicinal preparation comprising a quebracho tannin extract, the tannin content of the preparation being above 2 percent and below 10 per cent, boric acid as an acidifying agent in an amount sufficient to impart to the preparation a pH materially lower than the pH of the natural quebracho tannin extract, whereby the preparation is stable and does not precipitate over relatively long periods, and a phenolic antiseptic compound.

8. An aqueous medicinal preparation comprising an aqueous quebracho tannin extract, the tannin content of the preparation being above about 8 percent and below 10 per cent, the ratio of tannin to non-tannin in the extract being above 4.5, boric acid as an acidifying agent in an amount sufficient to impart to the preparation a pH materially lower than the pH of the natural quebracho tannin extract, whereby the preparation is stable and does not precipitate over relatively long periods, a phenolic antiseptic compound, and sufficient pectin to impart to the preparation a materially increased viscosity.

9. An aqueous medicinal preparation comprising an aqueous catechol tannin extract, the tannin content of the preparation being above 8 percent and below 10 per cent, sufficient boric acid to give to the preparation a pH of from about 3 to 4, sufficient pectin to increase the viscosity of the preparation, relatively small quantities of glycerol and urea, and a phenolic antiseptic compound.

10. An aqueous medicinal preparation according to claim 9 in which the catechol tannin comprises an extract of quebracho.

ELBERT M. SHELTON.